(No Model.)  2 Sheets—Sheet 1.

O. H. BASQUIN.
TESTING DEVICE.

No. 586,215.  Patented July 13, 1897.

Witnesses:
Frank S. Blanchard
Donald M. Carter

Inventor:
Olin H. Basquin
By _____ Attorney (No Model.) 2 Sheets—Sheet 2.

O. H. BASQUIN.
TESTING DEVICE.

No. 586,215. Patented July 13, 1897.

Witnesses:
Frank S. Blanchard
Donald McCarter

Inventor
Olin H. Basquin
By Francis W. Parker
Attorney

UNITED STATES PATENT OFFICE.

OLIN H. BASQUIN, OF CHICAGO, ILLINOIS, ASSIGNOR TO THE LUXFER PRISM PATENTS COMPANY, OF WEST VIRGINIA.

TESTING DEVICE.

SPECIFICATION forming part of Letters Patent No. 586,215, dated July 13, 1897.

Application filed February 9, 1897. Serial No. 622,647. (No model.)

*To all whom it may concern:*

Be it known that I, OLIN H. BASQUIN, a citizen of the United States, residing at Chicago, in the county of Cook and State of Illinois, have invented certain new and useful Improvements in Testing Devices, of which the following is a description.

My invention relates to testing devices to be used in connection with prismatic lights, and has for its object to provide a testing device by which any given window can be provided with prismatic glass and for indicating the dimensions of the prisms to be used in any given window in order to best direct the light toward any given point.

My invention is illustrated in the accompanying drawings, wherein—

Figure 1:
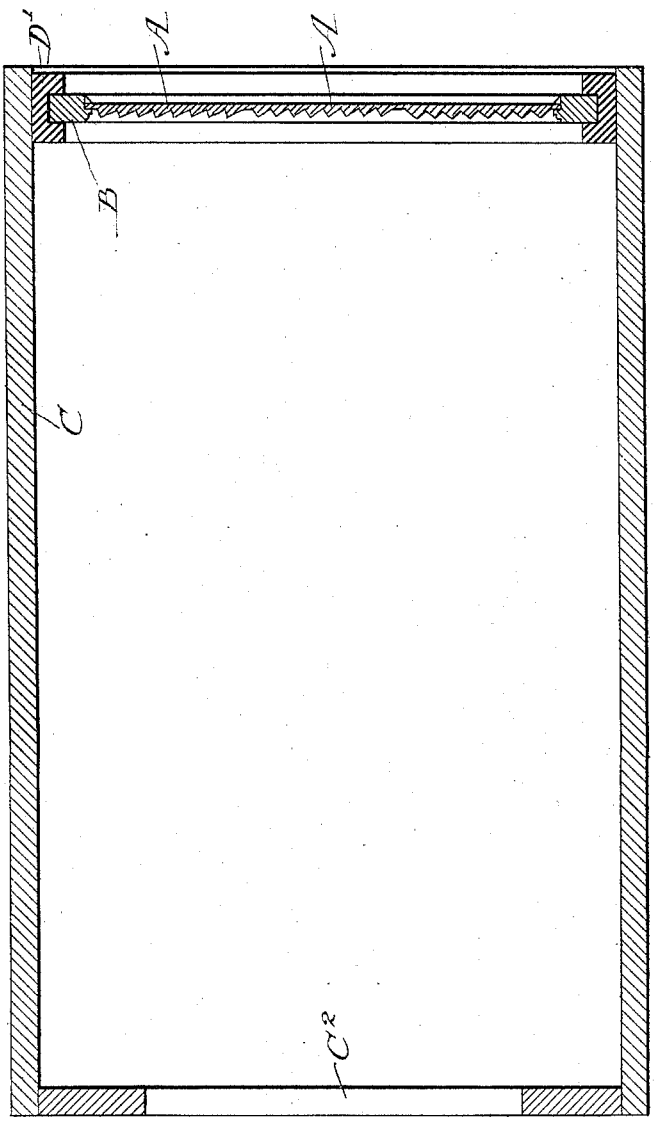
Figure 2:
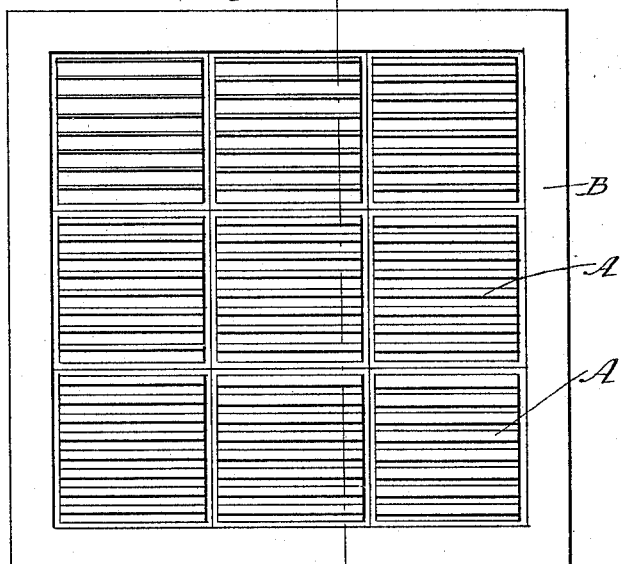
Figure 3:
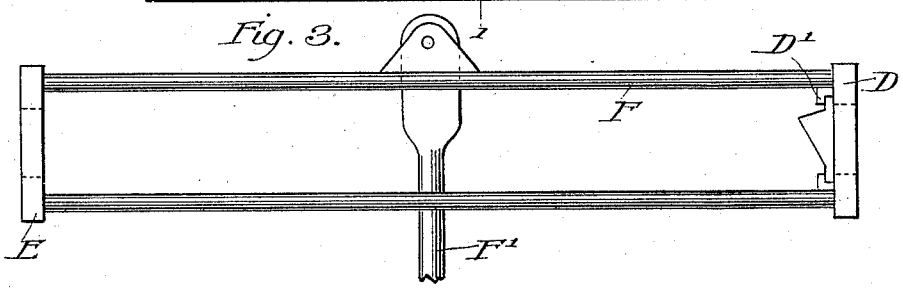
Figure 4:
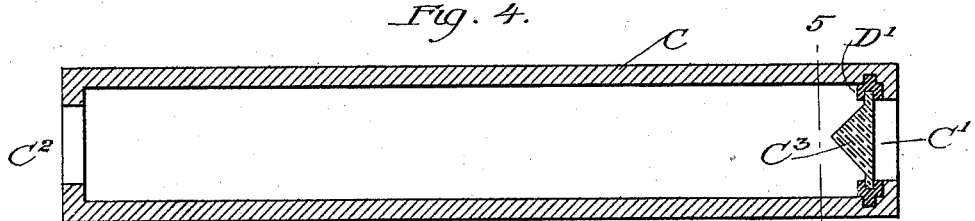
Figure 5:
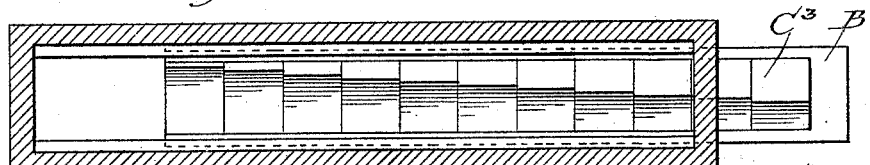

Figure 1 is a view of a set of testing-prisms in position in the testing-frame. Fig. 2 is a view of the testing-prisms separated from the testing-frame. Fig. 3 is a view of a modified form of testing frame and prisms. Fig. 4 is a view of a further modified form of testing-frame. Fig. 5 is a section on line 5 5, Fig. 4.

Like letters refer to like parts throughout the several figures.

Referring to the accompanying drawings, I have shown in Fig. 1 a series of tiles or plates A, of prismatic glass, bound together in any suitable manner—as, for example, by means of the frame B. These tiles or plates A are provided with prisms of varying angles. The prisms on any given tile may be of the same angle, the angles of the prisms on the various tiles being different, or each tile may be made up of a set of prisms of various angles. The frame B is adapted to be connected to the testing-frame C and may be stationary with relation to the testing-frame when in position, or the two frames may have a relative movement, so that one set of prisms can be replaced by another. The prisms may be used separate from the frame, if desired.

In Fig. 3 I have shown the testing-frame as consisting of a skeleton frame having the sides D and E connected together by the rods or pieces F and provided with a handle F', by which it is supported. In this construction a set of prisms are used, the prisms being placed end to end and connected together, so as to be held in place by the guides D'. The sides D and E may be entirely open or may simply be provided with one or more small holes.

As shown in Figs. 4 and 5, the testing-frame C consists of a closed box having the two openings C' and C². The prisms C³ are made with varying angles and are placed in the frame B. These prisms are preferably placed so that the angles gradually vary from one end toward the other. This frame is held in place by means of the guides D', and the set of prisms is adapted to be slid along said guides so as to be moved in position opposite the openings C' and C². The testing-frame may also be provided with the handle F', by which it can be supported in the proper position.

The prisms in connection with my device may be supported in any desired manner, and each prism may have its dimensions marked upon it, so that the dimension of the prism to be used can be easily and quickly ascertained by inspection.

I have shown several forms of testing devices embodying my invention; but it is of course evident that the form, construction, and arrangement may be varied without departing from the spirit of my invention, and I therefore do not wish to be limited in any particular to the construction herein shown and described.

The use and operation of my invention are as follows:

When prismatic lights are used—as, for example, in windows or the like—it is found that the result obtained from a given window at any given point depends upon the shape of the prisms used—that is, upon the angles of the surfaces of the prisms. When it is desired to find what prism should be placed in a given window in order to throw the light in a given direction, the testing-frame is placed so that the light from the window falls upon the prisms, the frame being so positioned that the given direction in which the light is to be thrown is that from the prisms to the observer's eye. The brightest prism represents the prism to be used in the window. The angle of this brightest prism is noted, and hence the angles of the prism to be used will then be known.

When the device shown in Figs. 1 and 2 is used, the prisms may be used in connection with the testing-frame or they may be placed at the window, the observer standing back at the point where the light is to be directed and picking out the proper prism.

I claim—

1. A testing device comprising a series of prisms of various angles connected together and adapted to be mounted in a testing-frame, provided with two openings, said prisms interposed between the openings in the testing-frame.

2. A testing device comprising a testing-frame provided with two openings, a series of prisms of varying angles, connected together and removably mounted in said testing-frame between said openings, said prisms adapted when held between the eye of the observer and a given window to indicate the proper prism to be used in order to best direct the light toward the point where the observer stands.

3. A testing device, comprising a series of prisms of various angles connected together and adapted to be interposed between the eye and the window or opening through which the light is admitted, said testing device adapted to indicate the proper prism to be used in said opening.

4. A testing device comprising a series of prisms of various angles connected together and adapted to be mounted in a testing-frame provided with two openings so as to be interposed between said openings, the angles of said prisms gradually increasing from one end of the series to the other, the whole mounted so that when held up between the observer's eye and the window or opening through which the light is admitted, the proper prism to be used in said opening is indicated by the first bright prism in the series.

5. A testing device comprising a series of prisms of various angles connected together and adapted to be mounted in a testing-frame provided with two openings, said prisms interposed between said openings, each prism being marked so as to indicate the angles thereof, said prisms uniformly varying from one end of the series toward the other whereby the proper prism for any given window may be found by interposing the series of prisms between the observer's eye and the window and noting the first bright prism in the series.

OLIN H. BASQUIN.

Witnesses:
DONALD M. CARTER,
BERTHA C. SIMS.